United States Patent
Bernini

(10) Patent No.: US 9,527,537 B2
(45) Date of Patent: Dec. 27, 2016

(54) SELF-PROPELLED ROBOT

(71) Applicant: Fabrizio Bernini, Bucine (IT)

(72) Inventor: Fabrizio Bernini, Bucine (IT)

(\*) Notice: Subject to any disclaimer, the term of this patent is extended or adjusted under 35 U.S.C. 154(b) by 0 days.

(21) Appl. No.: 14/744,598

(22) Filed: Jun. 19, 2015

(65) Prior Publication Data

US 2015/0375812 A1 Dec. 31, 2015

(30) Foreign Application Priority Data

Jun. 27, 2014 (IT) .................. FI2014A0156

(51) Int. Cl.
| | | |
|---|---|---|
| E04H 4/00 | (2006.01) | |
| G05D 1/00 | (2006.01) | |
| B62D 55/06 | (2006.01) | |
| E04H 4/16 | (2006.01) | |

(52) U.S. Cl.
CPC ............. B62D 55/06 (2013.01); E04H 4/1654 (2013.01); *Y10S 901/01* (2013.01)

(58) Field of Classification Search
CPC ....... B62D 55/06; E04H 4/1654; Y10S 901/01
See application file for complete search history.

(56) References Cited

U.S. PATENT DOCUMENTS

| | | | | |
|---|---|---|---|---|
| 4,016,768 A | * | 4/1977 | Mashburn .............. | G01D 11/30 74/23 |
| 4,397,101 A | * | 8/1983 | Rickard .................. | D06F 58/28 34/486 |
| 9,222,275 B2 | * | 12/2015 | Ben Dov .............. | E04H 4/1654 |
| 2008/0066979 A1 | * | 3/2008 | Carter ................. | B60L 11/1861 180/65.51 |
| 2009/0066275 A1 | * | 3/2009 | Takeuchi ............... | H02K 21/12 318/400.01 |
| 2011/0240382 A1 | * | 10/2011 | Gettings .............. | B62D 55/075 180/9.1 |
| 2012/0210527 A1 | | 8/2012 | Erlich et al. | |
| 2013/0031729 A1 | * | 2/2013 | Bernini ................. | E04H 4/1654 15/1.7 |
| 2014/0159468 A1 | * | 6/2014 | Heinen ................ | B60K 7/0007 301/6.3 |
| 2014/0184065 A1 | * | 7/2014 | Deery ................... | E04H 4/1654 315/55 |

FOREIGN PATENT DOCUMENTS

| | | |
|---|---|---|
| EP | 2554764 | 2/2013 |
| WO | 2014/039577 | 3/2014 |

OTHER PUBLICATIONS

European Search Report issued in Italian Patent Application No. FI2014A000156 dated Jun. 27, 2014.

\* cited by examiner

*Primary Examiner* — Joseph Rocca
*Assistant Examiner* — Marlon A Arce
(74) *Attorney, Agent, or Firm* — Lucas & Mercanti, LLP

(57) ABSTRACT

A self-propelled robot having a protective guard, at least one tool designed for the treatment of a surface, movement means comprising at least two motor-driven wheels to allow the movement of the self-propelled robot on a travel path, at least one mechanical power transmission designed to actuate the self-propelled robot and in which the one mechanical power transmission comprises at least one motor element and at least one driven element which are operatively associated by a magnetic field. The mechanical power transmission is operatively associated with at least two motor-driven wheels of the movement means.

10 Claims, 5 Drawing Sheets

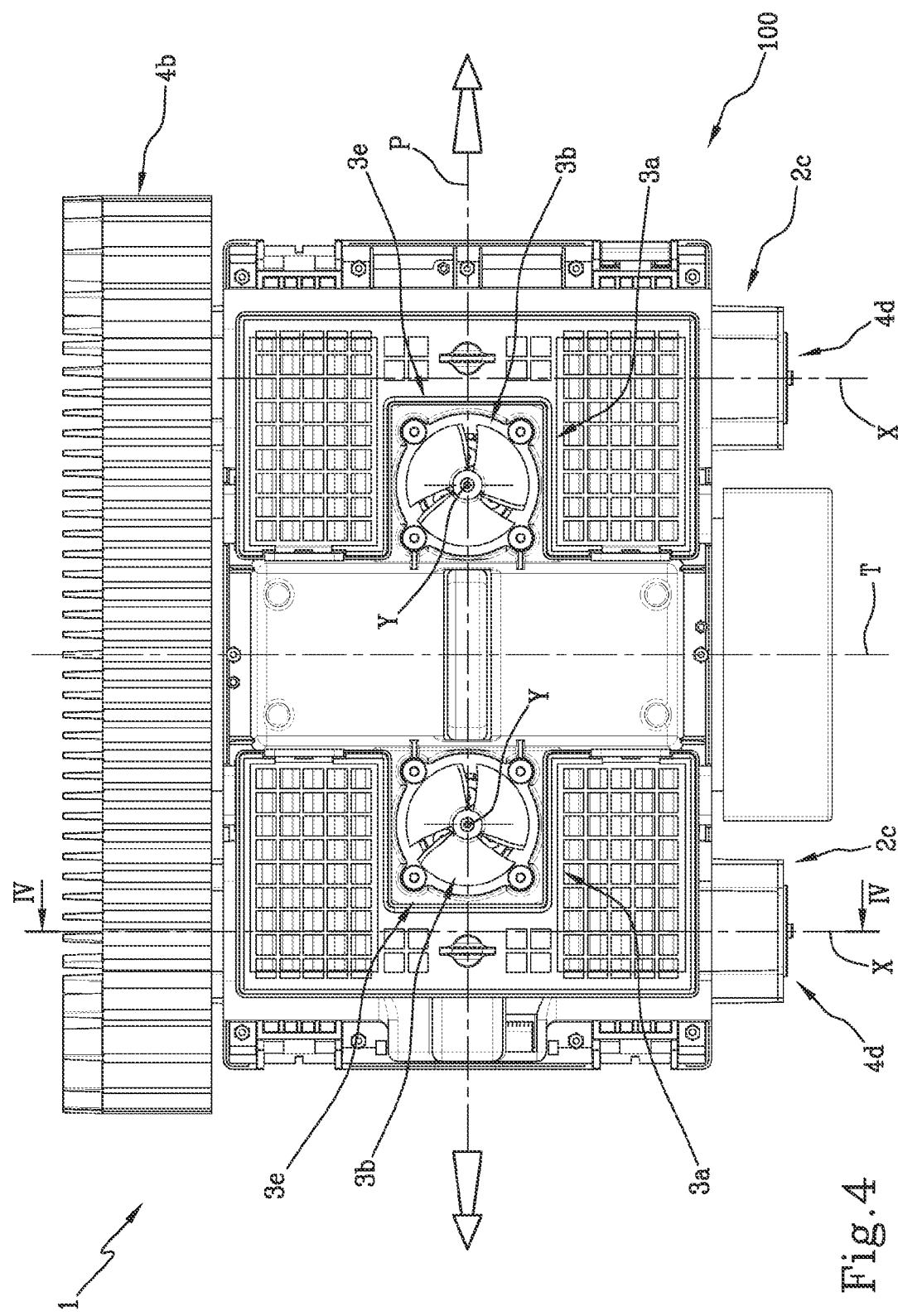

SELF-PROPELLED ROBOT

CROSS-REFERENCE TO RELATED APPLICATION

The present application claims the priority of Italian patent application No. FI2014A000156, filed Jun. 27, 2014, the contents of which are incorporated herein by reference.

FIELD OF THE INVENTION

This invention relates to a self-propelled robot for the treatment of a surface, having transmissions of contactless movable parts.

The surface, i.e. the object of the treatment, is intended to mean a floor, a garden lawn or the tiles of a swimming pool or tank or other similar surfaces.

Therefore, this invention relates to a self-propelled robot designed to perform different treatments of the surface, including removing dust and/or marks from the floor, cutting lawn grass or cleaning the tiles of the swimming pool.

BACKGROUND OF THE INVENTION

Prior art self-propelled robots are known which operate electrically and comprise tools for the treatment of surfaces (by way of example, brushes, cutting blades or the like) sometimes associated with a circuit for extracting debris or various impurities.

Known self-propelled robots also comprise movement means, by way of example wheels, tracks and the like, having specific shapes and dimensions on the basis of the predetermined scope of use.

Generally, the movement means and/or the tools of the self-propelled robot are connected to their respective electric motors by a mechanical power transmission, for example direct keying on the shaft of the motor or by interposed gear wheels for changing the transmission ratio between drive shaft and motor-driven wheel and/or impeller.

A self-propelled robot suitable for cleaning the surfaces of a swimming pool is illustrated by way of an example in document EP 2554764A1.

Generally, the above-mentioned electric motor is hermetically isolated from the outside and housed in a protective and structural shell and protrudes on the outside, by a sealed joint or a sealing gasket, only by the portion relative to the hub to couple with the wheels for the movement of the robot and/or with a tool of the robot. In other words, the known self-propelled robot has at least one mechanical power transmission which puts the inner part (a motor element) of the protective shell in contact with an external part (driven element) of the protective shell.

It is known that the sealed joint and/or the sealing gasket are elements of the robot that are subject to wear over time, both due to corrosion due to humidity/water and due to the depositing of any debris at the mechanical power transmission, for example between the shaft of an electric motor and a respective hermetic seal of the transmission, thus often compromising the overall hermetic seal of the robot.

Restoring the seals and replacing the worn elements requires complex maintenance that also involves manual intervention by a skilled technician. Moreover, even the smallest water infiltration inside the protective shell of a self-propelled robot may adversely affect the electronic circuits and the connections of the electrical cables contained inside, thus compromising its operation.

It should also be noted that following maintenance of the robot where it was necessary to open the protective shell even partly, the impermeable seals must be restored again by applying sealing mastics on the edges and stops of the shell, which requires skilled labour by a technician and hardening and curing times involving increased maintenance costs.

SUMMARY OF THE INVENTION

One aim of this invention is to provide a robot for the treatment of a surface which allows easy routine cleaning and washing maintenance in water by a user after use by means of a protective casing which is hermetically sealed from the outside and does not comprise even sealed connections between the inside and the outside of the shell.

A further aim of this invention is to provide a robot for the treatment of a surface which is free from the wear of the sealed joints at a mechanical power transmission which is designed to activate an element (a wheel or a tool) that is completely immersed in water, therefore is located outside the protective casing of the self-propelled robot, without resorting to sealed joints or to other types of impermeable seals subject to deterioration, aging and wear.

A further aim of this invention is to provide a structurally simpler self-propelled robot where the movable parts subject to wear such as the wheels or movement tracks or the impeller of an extractor of debris or a cutting blade can be replaced in a rapid and practical manner.

BRIEF DESCRIPTION OF THE DRAWINGS

Further features and advantages of the invention are more apparent in the non-limiting description which follows of a self-propelled robot illustrated in the accompanying drawings, in which:

FIG. 4 shows a plan view of the self-propelled robot of FIG. 3;

DETAILED DESCRIPTION OF THE INVENTION

Figure 1:
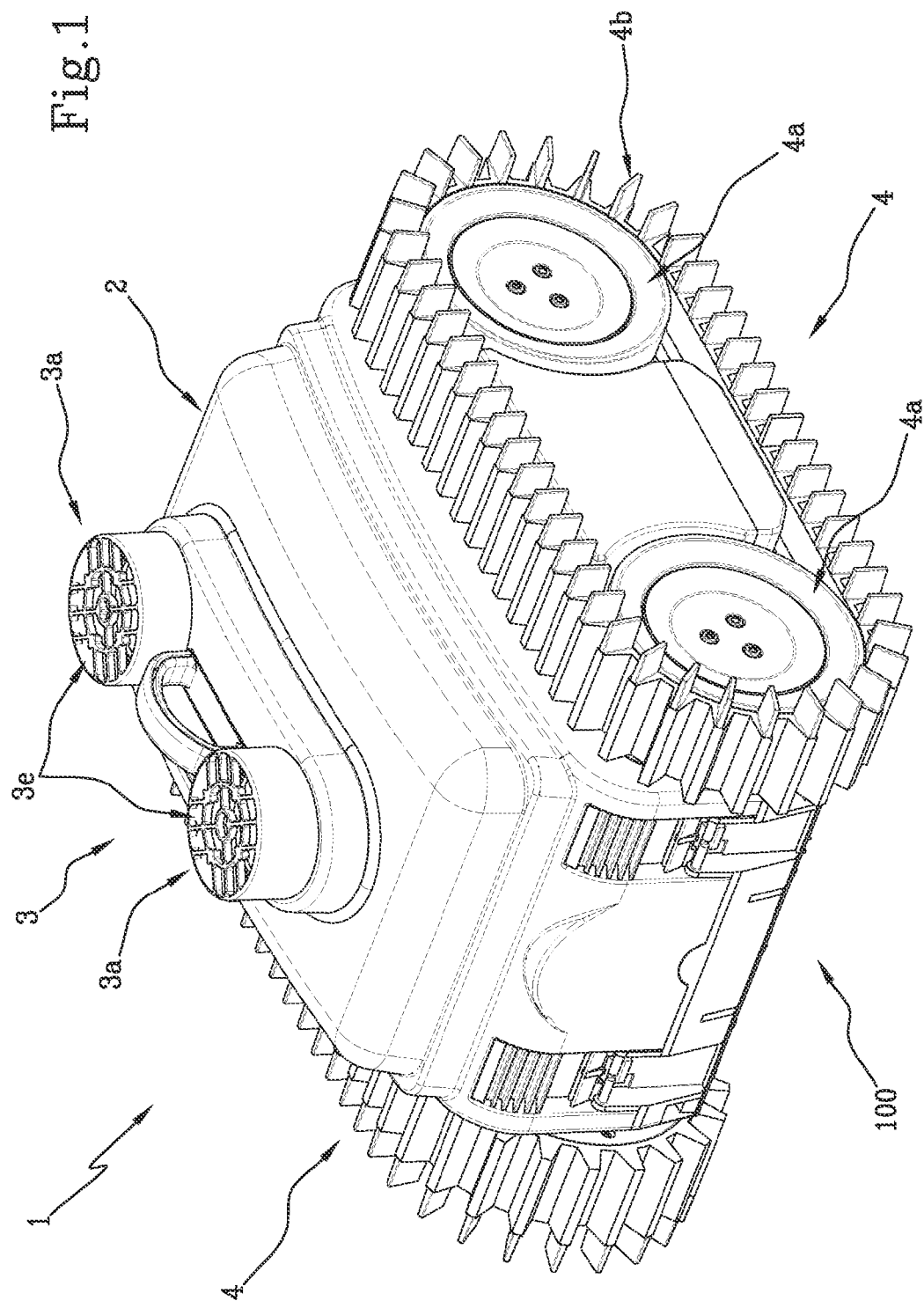
FIG. 1 is a perspective view of the self-propelled robot according to this invention.
Figure 2:
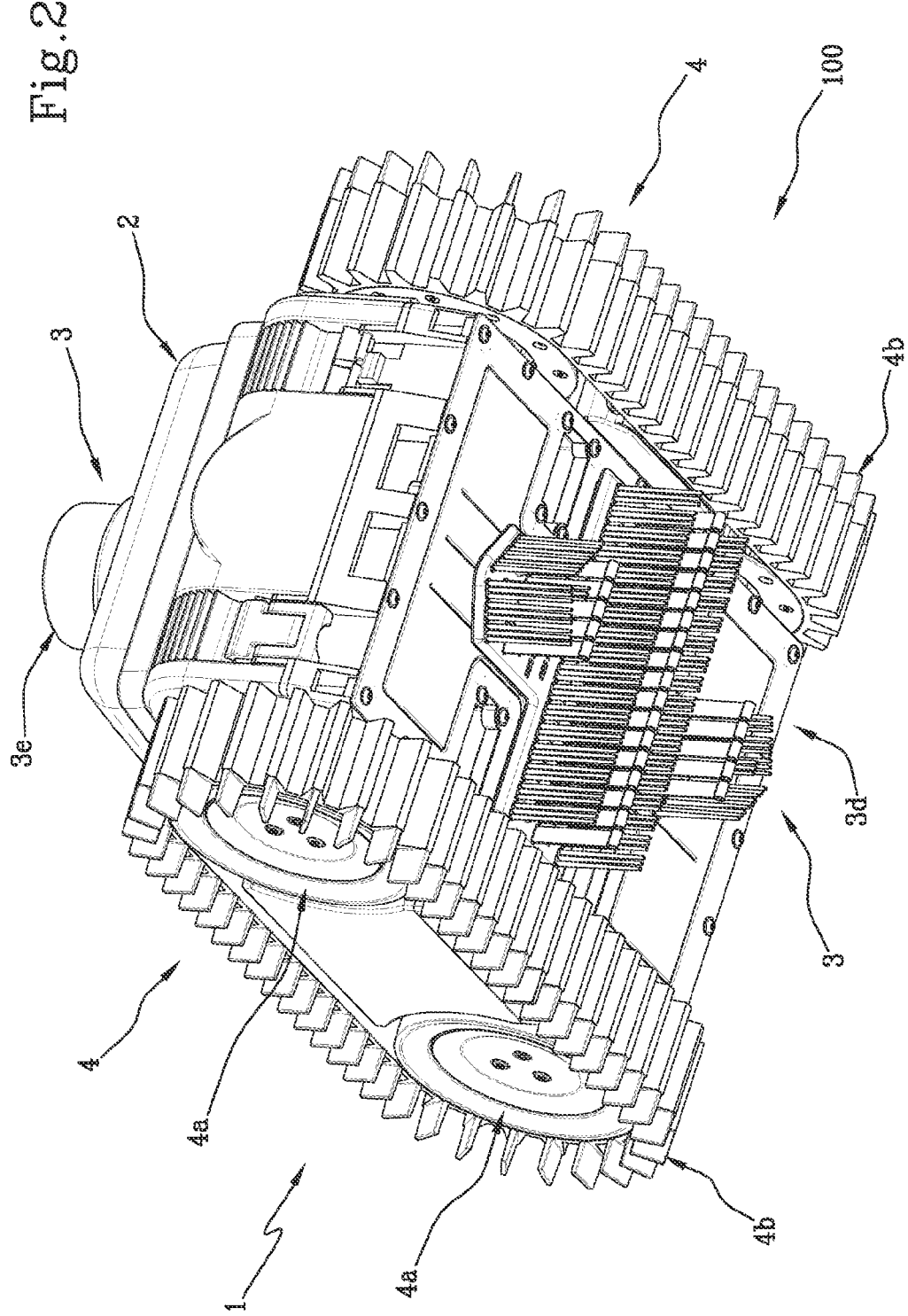
FIG. 2 shows a further perspective view of the self-propelled robot of FIG. 1.

With reference to the accompanying drawings, in accordance with this invention, a self-propelled robot 1 comprises a protective guard 2 having hermetic properties in at least one part of the guard 2 for isolating all components that are housed in it from humidity and/or water on the outside.

The components housed in an inner compartment 2a of the protective guard 2 may comprise electronic and electrical components such as, for example: electronic control units, batteries, electric motors, pressure, optical or other types of sensors, and the like.

The protective guard 2 is made of plastic material, and in any case is free of any type of conductor and/or corrosive effect when it comes in contact with rainwater, humidity from the outside environment or the water of a swimming pool or a tank. More specifically, the protective guard 2 is made, at least partly, of an electrically insulating material, such as, for example, plastic.

The self-propelled robot 1 comprises at least one tool 3 for the treatment of a surface such as for example a floor, a garden lawn or the tiles of a swimming pool or tank or other similar surfaces which require a specific treatment.

Thus, the tool 3 of the self-propelled robot 1 is structured in a different way in accordance with the type of surface to be treated, and may comprise, by way of example, a rotary brush for collecting debris and dust, a rotary blade for cutting the grass of the garden lawn or a system with fixed brushes for removing debris and dirt from a surface, respectively. It should be noted that not all the above-mentioned embodiments are illustrated in the accompanying drawings.

Preferably, the tool 3 also comprises a suction system which is operatively associated with the above-mentioned rotary brush, blade or fixed brush to collect debris, dust, grass and dirt and to send them to an accumulation zone.

The self-propelled robot 1 also comprises movement means 4 comprising at least four wheels 4a, at least two of which wheels are motor-driven 4a (one for each side of the robot 1), to allow the movement of the self-propelled robot 1 on a predetermined travel path.

In accordance with the inventive concept of this invention, a preferred, but not exclusive and limiting, embodiment is described below of the self-propelled robot 1 according to the invention for the treatment of surfaces of a swimming pool or tank.

Preferably, the tool 3 of the self-propelled robot 1 comprises at least one extractor 3a for the treatment of a surface of the swimming pool or tank. The extractor 3a is designed to interact with a surface of the swimming pool or tank, by an impeller 3b designed to create suction from the surface towards a tank for collecting debris and dirt.

The self-propelled robot 1 comprises two extractors 3a positioned along a longitudinal plane "P" of the robot 1, where the impellers 3b of the two extractors 3a are of the axial type, as illustrated schematically in FIG. 4. The actuation of the impellers 3b of the extractors 3a is determined by a respective electric motor 3c for each impeller 3b. The extractors 3a are operatively associated with a plurality of brushes 3d positioned on the lower part of the self-propelled robot 1 in such a way as to collect the debris and dirt and to convey them to a treatment and accumulation zone (not shown in the accompanying drawings) positioned along the conduit of the respective extractors 3a.

The water, which is purified and filtered by removing the debris and dirt, is collected and reintroduced into the swimming pool through openings 3e positioned on the upper part of the self-propelled robot 1, at which the impellers 3b are also preferably located.

In accordance with the preferred embodiment of the invention, the movement means 4 of the self-propelled robot 1 comprise the wheels 4a coupled with a track 4b for each side of the self-propelled robot 1.

The tracks 4b are preferably provided with an abrasive surface or such as to generate a high friction coefficient between them and a surface of a swimming pool.

Figure 3:
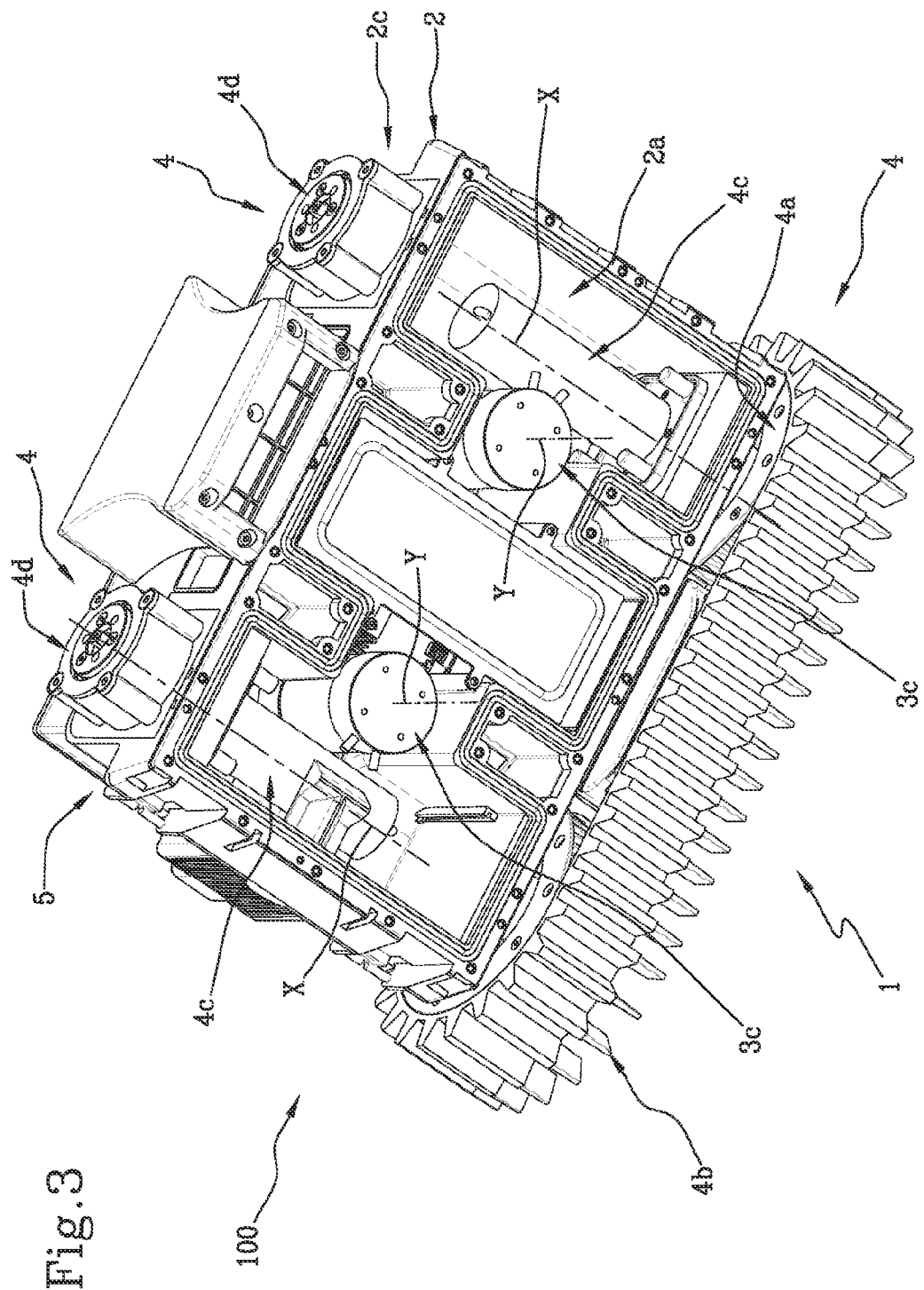
FIG. 3 shows a perspective view of the self-propelled robot of FIG. 1, with some parts cut away to better illustrate certain details which would otherwise be hidden.

Preferably, in reference now to FIG. 3, the movement means 4 comprise, for each motor-driven wheel 4a, a respective electric motor 4c powered by an internal battery (not shown in the accompanying drawings). The wheels 4a of the self-propelled robot 1 rotate relative to an axis of rotation "X," the axis of rotation "X" is also preferably the axis of rotation of the respective electric motor 4c of each motor-driven wheel 4a.

Preferably, the self-propelled robot 1 has the protective guard 2 with substantially symmetrical spaces relative to a transversal plane "T," positioned perpendicularly to the longitudinal plane "P". In other words, the self-propelled robot 1 has the same shape for both sides facing in both directions of travel, except for minor differences not illustrated in detail in the accompanying drawings. This general symmetry of the self-propelled robot 1 gives it increased properties of ease of handling, especially during the disengaging manoeuvres, and the same stability and capacity of movement in both directions of travel (as illustrated in detail in FIG. 4) with the same effectiveness.

The self-propelled robot 1 comprises at least one mechanical power transmission 5 designed to actuate the robot 1 in an operating configuration of use of it.

For greater detail, a mechanical power transmission is defined as a connection designed to transmit a mechanical torque, and therefore power, from a motor element to a driven element. By way of example, a mechanical power transmission may be identified as a connection between a shaft of an electric motor (driving element) and a hub, keyed on the shaft, of a wheel (driven element) of a self-propelled robot. Similarly, a mechanical power transmission may be identified between a shaft of an electric motor and the hub of an impeller of an extractor of a robot for the treatment of surfaces of a swimming pool, such as the self-propelled robot 1.

In accordance with the inventive concept of this invention, the self-propelled robot 1 comprises at least one mechanical power transmission 5 comprising at least one motor element and at least one driven element which are operatively associated by a magnetic and/or electromagnetic field. Some examples of a motor element and of a driven element in accordance with this invention, are illustrated below.

Advantageously, a mechanical coupling by a magnetic and/or electromagnetic field between a motor element and a driven element allows achieving an impermeable isolation, therefore free of any infiltration of water, between the motor element and the driven element associated operatively with it. In other words, it allows achieving an impermeable isolation between the inner compartment 2a of the protective guard 2 and an external environment 100 of the protective guard 2, respectively, of the self-propelled robot 1.

In accordance with the inventive concept of this invention, the mechanical power transmission 5 is operatively associated with at least two motor-driven wheels 4a of the movement means 4 of the self-propelled robot 1, preferably at least one wheel 4a for each side of the self-propelled robot 1. Advantageously, the driven element of the mechanical power transmission 5 comprises respective hubs 4d of the at least two motor-driven wheels 4a of the self-propelled robot 1. A respective electric motor 4c is associated with the motor element of the mechanical power transmission 5 of the movement means 4. The accompanying drawings 4 and 4A illustrate in detail the mechanical power transmission 5 operatively associated with at least one wheel 4a of the movement means 4.

In detail, the motor element of the mechanical power transmission 5 comprises an electric motor 4c having, keyed on a respective shaft 6, an energising drum 7, which is rotatable about the axis of rotation "X".

The energising drum 7 comprises, on a peripheral surface 7a, a plurality of plates 7b made of magnetic material and a central body 7c designed to house the magnetic material plates 7b.

Preferably, the magnetic material plates 7b are angularly equispaced on the peripheral surface 7a about the axis of rotation "X" and are such as to define the peripheral surface 7a of the energising drum 7 with a respective surface facing towards the outside of the energising drum 7.

The protective guard 2 has, at the energising drum 7, a housing compartment 2b designed to at least house the dimensions of the energising drum 7 keyed on the respective shaft 6 of the electric motor 4c. In other words, the electric motor 4c, including its own shaft 6 and the energising drum 7, is completely housed inside protective guard 2, that is to say, is hermetically isolated from the outside 100.

Preferably, the housing compartment 2b is made as one with the protective guard 2, so as not to require the use of hermetic seals and/or sealing mastics.

The motor element described above is operatively associated with the driven element of the mechanical power transmission 5 comprising at least one driven crown 8 and having a plurality of plates 8a made of ferromagnetic material, preferably the ferromagnetic material plates 8a are positioned along an inner surface 8b of the driven crown 8 and are angularly equispaced about the axis of rotation "X".

Advantageously, the hubs 4d of the at least two motor-driven wheels 4a of the self-propelled robot 1 respectively comprise the driven crown 8, which is fixed on the hubs 4d with a rigid constraint without movements and relative rotations between them. The hubs 4d of the at least two wheels 4a with the respective driven crowns 8 (see the illustration of FIG. 4A) are fixed on a respective connecting portion 2c of the protective guard 2 and are completely positioned outside 100 the protective guard 2, therefore without having any contact with the inner compartment 2a.

Preferably, each connecting portion 2c of the protective guard 2 comprises at least one ball bearing designed to fasten the respective hub 4d of the wheel 4a, regardless of the latter being motor-driven or not motor-driven, that is idle.

The driven crown 8 and the energising drum 7 have respective circumferential dimensions such as to be concentric to each other in an operating configuration of use of the self-propelled robot 1.

Figure 4A:
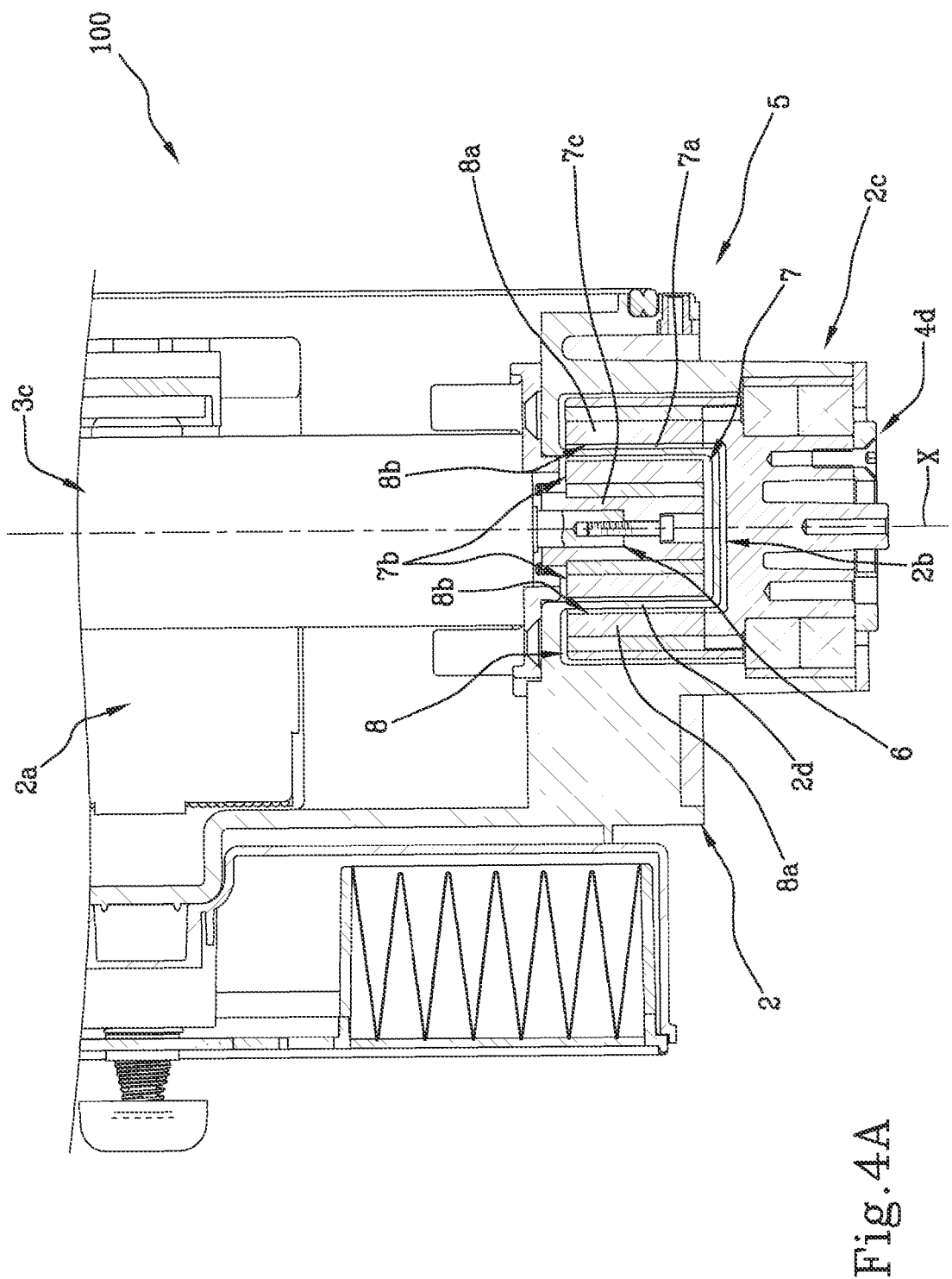
FIG. 4A shows a cross section of a detail of the self-propelled robot, along the cross-sectional line of FIG. 4.

Preferably, the driven crown 8 of the mechanical power transmission 5 has a greater diameter than the diameter of the energising drum 7, that is the inner surface 8b of the driven crown 8 has a larger diameter than the diameter of the outer surface 7a of the energising drum 7. In the detail of FIG. 4A, the two inner surface 8b and outer surface 7a of the driven crown 8 and of the energising drum 7, respectively, are opposite to each other and are hermetically separated by a separating wall 2d forming part of the housing compartment 2b of the protective guard 2.

In an operating configuration of use of the self-propelled robot 1, the rotation of the energising drum 7, which is driven in rotation by the respective electric motor 4c, generates a magnetic field such as to induce the driven crown 8 into rotation about the axis of rotation "X", thus putting the respective hub 4c and the respective motor-driven wheel 4a in rotation and allowing the movement of the robot 1.

Vice versa, in a configuration of the self-propelled robot 1 having the non-operational movement means 4, the energising drum 7 is stopped so that the magnetic field which interacts between the energising drum 7 and the respective driven crown 8 associated with it is zero or weak to the point that the respective hub 4d connected to the driven crown 8 does not receive any drive torque capable of putting the self-propelled robot 1 into movement.

In this configuration of the self-propelled robot 1, the two motor-driven wheels 4a are not subject to any drive torque, preferably they are free to rotate about the axis "X" without any mechanical constraint of rotation.

Preferably, each plurality of magnetic material plates 7b and ferromagnetic material plates 8a of the energising drum 7 and of the driven crown 8, respectively, are numerically equal to each other.

In accordance with the inventive concept of this invention, relative to a reference point not illustrated in the accompanying drawings, the magnetic material plates 7b may have a succession of magnetic poles (generally identified as "N" for the negative pole and "P" for the positive pole) with a sequence N-P-N or with a sequence P-N-P.

Similarly, the respective ferromagnetic material plates 8a can be positioned in the same way and undergo induction from a different magnetic field depending on the type of positioning sequence of the magnetic material plates 7b. These positions do not influence the final result in terms of drive torque transmitted through the mechanical power transmission 5, however the numerical quantity of the plates 7b, 8a can determine a variation of the overall mechanical power transmitted to the movable parts, such as for example, the motor-driven wheels 4a.

Preferably, the electric motor 3c, 4c may be of the traditional type or of the "brushless" type, for improved control of the operation of the self-propelled robot 1, especially during disengaging manoeuvres.

In accordance with the inventive concept of this invention, in a different embodiment of the self-propelled robot 1 not illustrated in the accompanying drawings, in addition to being associated with at least two motor-driven wheels 4a of the movement means 4, the mechanical power transmission 5 is also operatively associated with the two extractors 3a of the tool 3 of the robot 1. In other words, the self-propelled robot 1 comprises both the movement means 4 and the tool 3, which are operatively associated with a mechanical power transmission 5.

Advantageously, the driven element of the mechanical power transmission 5 comprises an impeller 3b of each extractor 3a of the tool 3, the impellers 3b are rotatable about a respective axis "Y". Therefore, a respective electric motor 3b is associated with the motor element of the mechanical power transmission 5 of the tool 3, the axis of rotation of the shaft 6 of the electric motor 3c preferably coincides with the axis of rotation "Y" of the impellers 3b.

Advantageously, each impeller 3b of the self-propelled robot 1 comprises a respective driven crown 8, which is fixed to the body of the impeller 3b to form a rigid piece without movements and rotations between them.

In an operating configuration of use of the self-propelled robot 1, the rotation of each energising drum 7, which is driven in rotation about the axis of rotation "Y" by the respective electric motor 3c, generates a magnetic field such as to induce the driven crown 8 into rotation about the axis of rotation "Y", thus putting in rotation the respective impeller 3b and allowing at least the cleaning of the surface of the swimming pool.

Vice versa, in a configuration of the self-propelled robot 1 having the non-operational tool 3, the energising drum 7 is stopped and therefore the magnetic field which interacts between the energising drum 7 and the respective driven crown 8 associated with it is zero or so weak that the respective impeller 3b connected to the driven crown 8 does not receive any drive torque such as to put the water into movement and create a suction from the surface of the swimming pool.

In this configuration of the self-propelled robot 1, the impellers 3b are free to rotate about their own axis of rotation "Y" without any mechanical constraint of rotation.

The impellers 3b of the two extractors 3a and the respective driven crowns 8 (not illustrated in the accompanying drawings) are fixed on a respective connecting portion of the protective guard 2 and are completely positioned outside 100 the protective guard 2, therefore without having any contact with the inner compartment 2a in which the respective electric motors 3c are positioned.

To avoid the direct contact with the water, the ferromagnetic material plates 8a of the driven crown 8, which is fixed on the hubs 4d of the wheels 4a and/or on the impellers 3b of the extractor 3a, may be covered by a thin layer of plastic material.

In a further embodiment of this invention, not illustrated in the accompanying drawings, a mechanical reduction gear unit is also interposed at a mechanical power transmission in such a way as to reduce the number of revolutions of the driven ring associated with the hub of the motor-driven wheel relative to the number of revolutions made by the energising drum and therefore by the electric motor associated with it.

The aim of this invention has been reached by a self-propelled robot for the treatment of a surface such as a floor, a garden lawn or the tiles of a swimming pool or tank or other similar surfaces, like the one described above.

Advantageously, the self-propelled robot makes it possible to perform complete routine washing maintenance after its use without any risk of affecting electrical and/or mechanical components of the robot. In other words, the self-propelled robot may be completely immersed in water or subjected to a jet of high-pressure water for cleaning the tool (blade, brush or similar tool).

Advantageously, the robot described allows performing extraordinary maintenance quickly and economically by eliminating the need to replace gaskets and sealed joints due to wear since there are no movable sliding elements and/or elements in contact with a respective hermetic seal.

Another advantage of the robot is the one of allowing the replacement of the components most subject to wear, such as for example, the wheels and/or the tracks or the impellers of the tool, in a simple and rapid manner and without having to resort to opening the protective guard of the robot.

Moreover, the self-propelled robot comprising the mechanical power transmission made as in this invention is advantageously free of any type of mechanical wear because there isn't any physical contact between a motor element and a driven element in an operating configuration of use thereof.

The invention claimed is:

1. A self-propelled robot for the treatment of a surface, comprising:
    a protective guard;
    at least one tool;
    movement means comprising at least two motor-driven wheels to allow the movement of the self-propelled robot on a travel path;
    at least one mechanical power transmission designed to actuate the self-propelled robot, and
    wherein the at least one mechanical power transmission comprises at least one motor element and at least one driven element,
        the mechanical power transmission being operatively associated with the at least two motor-driven wheels of the movement means, characterised in that the motor element of the mechanical power transmission comprises an electric motor having an energizing drum keyed on its own shaft, the energizing drum being rotatable about an axis of rotation ("X"),
        the mechanical power transmission being operatively associated via magnetic coupling with an extractor of the at least one tool, and
    wherein the driven element of the mechanical power transmission comprises at least one driven crown having a plurality of plates made of ferromagnetic material and respective hubs of the at least two motor-driven wheels.

2. The robot according to claim 1, wherein the energizing drum comprises, on a peripheral surface, a plurality of plates made of magnetic material and a central body designed to house the magnetic material plates.

3. The robot according to claim 1, wherein the driven crown is positioned along the axis of rotation ("X") in coaxial manner relative to the energizing drum, the driven crown is concentric relative to the energizing drum.

4. The robot according to claim 1, wherein the driven element of the mechanical power transmission comprises an impeller of the at least one tool.

5. The robot according to claim 2 wherein the plurality of magnetic material plates of the energizing drum are numerically equal to respective plates of the plurality of plates made of ferromagnetic material of the driven crown, the energizing drum being housed inside the protective guard.

6. A self-propelled robot for the treatment of a surface, comprising:
    a protective guard;
    at least one tool;
    movement means comprising at least two motor-driven wheels to allow the movement of the self-propelled robot on a travel path;
    at least one mechanical power transmission designed to actuate the self-propelled robot, and
    wherein the at least one mechanical power transmission comprises at least one motor element and at least one driven element,
        the mechanical power transmission being operatively associated with the at least two motor-driven wheels of the movement means, characterised in that the motor element of the mechanical power transmission comprises an electric motor having an energizing drum keyed on its own shaft, the energizing drum being rotatable about an axis of rotation ("X"), and
    wherein the driven element of the mechanical power transmission comprises at least one driven crown having a plurality of plates made of ferromagnetic material, respective hubs of the at least two motor-driven wheels and an impeller of the at least one tool.

7. The robot according to claim 6, wherein the mechanical power transmission is operatively associated via magnetic coupling with an extractor of the at least one tool.

8. The robot according to claim 6, wherein the energizing drum comprises, on a peripheral surface, a plurality of plates made of magnetic material and a central body designed to house the magnetic material plates.

9. The robot according to claim 6, wherein the driven crown is positioned along the axis of rotation ("X") in coaxial manner relative to the energizing drum, the driven crown is concentric relative to the energizing drum.

10. The robot according to claim 8 wherein the plurality of magnetic material plates of the energizing drum are numerically equal to respective plates of the plurality of plates made of ferromagnetic material of the driven crown, the energizing drum being housed inside the protective guard.

* * * * *